United States Patent
Inoue et al.

(10) Patent No.: US 12,371,071 B2
(45) Date of Patent: Jul. 29, 2025

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Daichi Inoue, Tokyo (JP); Sho Tamura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 173 days.

(21) Appl. No.: 18/236,959

(22) Filed: Aug. 23, 2023

(65) Prior Publication Data
US 2024/0067229 A1 Feb. 29, 2024

(30) Foreign Application Priority Data
Aug. 24, 2022 (JP) .................... 2022-133295

(51) Int. Cl.
*B60W 30/182* (2020.01)
*B60W 40/06* (2012.01)
(Continued)

(52) U.S. Cl.
CPC ........ *B60W 60/0053* (2020.02); *B60W 40/06* (2013.01); *G06V 20/588* (2022.01); *B60W 2420/403* (2013.01); *B60W 2552/53* (2020.02)

(58) Field of Classification Search
CPC ............... B60W 30/182; B60W 40/06; B60W 2420/403; B60W 60/00; G06V 20/56
See application file for complete search history.

(56) References Cited

U.S. PATENT DOCUMENTS

2016/0259335 A1 9/2016 Oyama
2018/0039270 A1 2/2018 Satake et al.
(Continued)

FOREIGN PATENT DOCUMENTS

JP 2015-223941 12/2015
JP 2016-162299 9/2016
(Continued)

OTHER PUBLICATIONS

Japanese Office Action for Japanese Patent Application No. 2022-133295 dated Nov. 21, 2023.

*Primary Examiner* — Tan Q Nguyen
(74) *Attorney, Agent, or Firm* — Amin, Turocy & Watson, LLP (57) ABSTRACT

A vehicle control device includes a storage medium storing computer-readable instructions and a processor connected to the storage medium. The processor executes the computer-readable instructions to recognize a surrounding situation of a vehicle using at least a camera, decide on a driving mode of the vehicle as one of a first driving mode and a second driving mode on the basis of the surrounding situation and map information and change the driving mode from the second driving mode to the first driving mode when it is determined that information of a stationary target group detected by a space detection sensor mounted in the vehicle matches information of a free space detected on the basis of an image captured by the camera, a camera road marking matches the information of the free space, and there is interference between the information of the stationary target group and the map road marking in a case where it is determined that the camera road marking does not match the map road marking while the vehicle is traveling in the second driving mode.

13 Claims, 7 Drawing Sheets

(51) Int. Cl.
  *B60W 60/00*          (2020.01)
  *G06V 20/56*          (2022.01)

(56)        References Cited

U.S. PATENT DOCUMENTS

2018/0286247  A1     10/2018  Fujita
2019/0217844  A1*     7/2019  Pursifull ............... B60W 10/06
2019/0300013  A1     10/2019  Shiraishi et al.
2022/0234599  A1      7/2022  Tsuji et al.
2023/0322208  A1*    10/2023  Rojas .................. B60W 50/085
                                                           701/41
2023/0347942  A1     11/2023  Kobayashi et al.

FOREIGN PATENT DOCUMENTS

JP      2017-146724        8/2017
JP      2018-021832        2/2018
JP      2019-038289        3/2019
JP      2019-168814       10/2019
JP      2019-172112       10/2019
JP      2022-114995        8/2022
WO      2017/056247        4/2017
WO      2022/144957        7/2022

* cited by examiner

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2022-133295, filed Aug. 24, 2022, the content of which is incorporated herein by reference.

BACKGROUND

Field of the Invention

The present invention relates to a vehicle control device, a vehicle control method, and a storage medium.

Description of Related Art

Conventionally, technology for generating a target trajectory of a vehicle on the basis of an image captured by a camera mounted in the vehicle and causing the vehicle to travel along the generated target trajectory is known. For example, Japanese Unexamined Patent Application, First Publication No. 2015-223941 discloses technology for setting a target runway with respect to one lane boundary line substantially parallel to a travel direction between two lane boundaries recognized using a front camera.

In the technology described in Japanese Unexamined Patent Application, First Publication No. 2015-223941, the target runway of the vehicle is set on the basis of information recognized using the front camera. However, for example, when the target runway of the vehicle is set using map information in addition to the camera, the content of the camera information may deviate from that of the map information and a correct runway may not be estimated.

SUMMARY

The present invention has been made in consideration of such circumstances and an objective of the present invention is to provide a vehicle control device, a vehicle control method, and a storage medium capable of estimating a correct runway even if the content of camera information deviates from that of map information.

A vehicle control device, a vehicle control method, and a storage medium according to the present invention adopt the following configurations.

(1): According to an aspect of the present invention, there is provided a vehicle control device including: a storage medium storing computer-readable instructions; and a processor connected to the storage medium, the processor executing the computer-readable instructions to: recognize a surrounding situation of a vehicle using at least a camera; control steering, acceleration, and deceleration of the vehicle independently of an operation of a driver of the vehicle on the basis of the surrounding situation and map information; decide on a driving mode of the vehicle as one of a plurality of driving modes including a first driving mode and a second driving mode and change the driving mode of the vehicle to a driving mode having a heavier task when a task related to the decided driving mode is not executed by the driver, wherein the second driving mode is a driving mode having a lighter task imposed on the driver than the first driving mode and some of the plurality of driving modes including at least the second driving mode are controlled independently of the operation of the driver of the vehicle; when it is determined that a camera road marking included in the surrounding situation does not match a map road marking included in the map information after it is determined whether or not the camera road marking matches the map road marking while the vehicle is traveling in the second driving mode, determine whether or not information of a stationary target group detected by a space detection sensor mounted in the vehicle matches information of a free space detected on the basis of an image captured by the camera; determine whether or not the camera road marking matches the information of the free space; determine whether or not there is interference between the information of the stationary target group and the map road marking; and change the driving mode from the second driving mode to the first driving mode referring to the camera road marking when it is determined that the information of the stationary target group matches the information of the free space, the camera road marking matches the information of the free space, and there is interference between the information of the stationary target group and the map road marking.

(2): In the above-described aspect (1), the stationary target group is a continuous road structure, and the hardware processor calculates an angle between an extension direction of the road structure and an extension direction of the free space and determines whether or not the information of the stationary target group matches the information of the free space by determining whether or not the angle is less than or equal to a first threshold value.

(3): In the above-described aspect (1), the hardware processor calculates an angle between the camera road marking and an extension direction of the free space and determines whether or not the camera road marking matches the information of the free space by determining whether or not the angle is less than or equal to a second threshold value.

(4): In the above-described aspect (1), the space detection sensor is a radar device, and the hardware processor determines whether or not there is interference between the information of the stationary target group detected by the radar device and the map road marking.

(5): In the above-described aspect (1), the hardware processor changes the driving mode from the second driving mode to the first driving mode referring to the camera road marking when a period in which it is determined that the information of the stationary target group matches the information of the free space, the camera road marking matches the information of the free space, and there is interference between the information of the stationary target group and the map road marking is greater than or equal to a first period.

(6): In the above-described aspect (1), the hardware processor continues the second driving mode referring to the map road marking when it is determined that the information of the stationary target group does not match the information of the free space, the camera road marking does not match the information of the free space, or there is no interference between the information of the stationary target group and the map road marking.

(7): In the above-described aspect (1), the hardware processor continues the first driving mode referring to the camera road marking for at least a second prescribed period when the driving mode has been changed to the first driving mode referring to the camera road marking.

(8): In the above-described aspect (1), the hardware processor returns the driving mode from the first driving mode referring to the camera road marking to the second driving mode after the first driving mode referring to the camera road marking is continued for a second prescribed period.

(9): In the above-described aspect (8), the hardware processor returns the driving mode from the first driving mode referring to the camera road marking to the second driving mode when it is determined that the information of the stationary target group does not match the information of the free space, the camera road marking does not match the information of the free space, or there is no interference between the information of the stationary target group and the map road marking after the first driving mode referring to the camera road marking is continued for a second prescribed period.

(10): In the above-described aspect (1), the hardware processor changes the driving mode from the first driving mode referring to the camera road marking to manual driving of the vehicle by the driver of the vehicle when it is determined that the information of the stationary target group matches the information of the free space, the camera road marking matches the information of the free space, and there is interference between the information of the stationary target group and the map road marking after the first driving mode referring to the camera road marking is continued for a third prescribed period.

(11): In the above-described aspect (1), the hardware processor continues the second driving mode without changing the driving mode from the second driving mode to the first driving mode referring to the camera road marking if it is determined that there is a preceding vehicle in front of the vehicle when it is determined that the information of the stationary target group matches the information of the free space, the camera road marking matches the information of the free space, and there is interference between the information of the stationary target group and the map road marking.

(12): According to another aspect of the present invention, there is provided a vehicle control method including: recognizing, by a computer, a surrounding situation of a vehicle using at least a camera; controlling, by the computer, steering, acceleration, and deceleration of the vehicle independently of an operation of a driver of the vehicle on the basis of the surrounding situation and map information; deciding, by the computer, on a driving mode of the vehicle as one of a plurality of driving modes including a first driving mode and a second driving mode and changing the driving mode of the vehicle to a driving mode having a heavier task when a task related to the decided driving mode is not executed by the driver, wherein the second driving mode is a driving mode having a lighter task imposed on the driver than the first driving mode and some of the plurality of driving modes including at least the second driving mode are controlled independently of the operation of the driver of the vehicle; if the driving mode of the vehicle is changed to the driving mode having the heavier task when the task related to the decided driving mode is not executed by the driver and it is determined that a camera road marking included in the surrounding situation does not match a map road marking included in the map information after it is determined whether or not the camera road marking matches the map road marking while the vehicle is traveling in the second driving mode, determining, by the computer, whether or not information of a stationary target group detected by a space detection sensor mounted in the vehicle matches information of a free space detected on the basis of an image captured by the camera; determining, by the computer, whether or not the camera road marking matches the information of the free space; determining, by the computer, whether or not there is interference between the information of the stationary target group and the map road marking; and changing, by the computer, the driving mode from the second driving mode to the first driving mode referring to the camera road marking when it is determined that the information of the stationary target group matches the information of the free space, the camera road marking matches the information of the free space, and there is interference between the information of the stationary target group and the map road marking.

(13): According to yet another aspect of the present invention, there is provided a computer-readable non-transitory storage medium storing a program for causing a computer to: recognize a surrounding situation of a vehicle using at least a camera; control steering, acceleration, and deceleration of the vehicle independently of an operation of a driver of the vehicle on the basis of the surrounding situation and map information; decide on a driving mode of the vehicle as one of a plurality of driving modes including a first driving mode and a second driving mode and change the driving mode of the vehicle to a driving mode having a heavier task when a task related to the decided driving mode is not executed by the driver, wherein the second driving mode is a driving mode having a lighter task imposed on the driver than the first driving mode and some of the plurality of driving modes including at least the second driving mode are controlled independently of the operation of the driver of the vehicle; when it is determined that a camera road marking included in the surrounding situation does not match a map road marking included in the map information after it is determined whether or not the camera road marking matches the map road marking while the vehicle is traveling in the second driving mode, determine whether or not information of a stationary target group detected by a space detection sensor mounted in the vehicle matches information of a free space detected on the basis of an image captured by the camera; determine whether or not the camera road marking matches the information of the free space; determine whether or not there is interference between the information of the stationary target group and the map road marking; and change the driving mode from the second driving mode to the first driving mode referring to the camera road marking when it is determined that the information of the stationary target group matches the information of the free space, the camera road marking matches the information of the free space, and there is interference between the information of the stationary target group and the map road marking.

According to (1) to (13), it is possible to estimate a correct runway even if the content of camera information deviates from that of map information.

DESCRIPTION OF EMBODIMENTS

Hereinafter, embodiments of a vehicle control device, a vehicle control method, and a storage medium of the present invention will be described with reference to the drawings.
[Overall Configuration]

Figure 1:
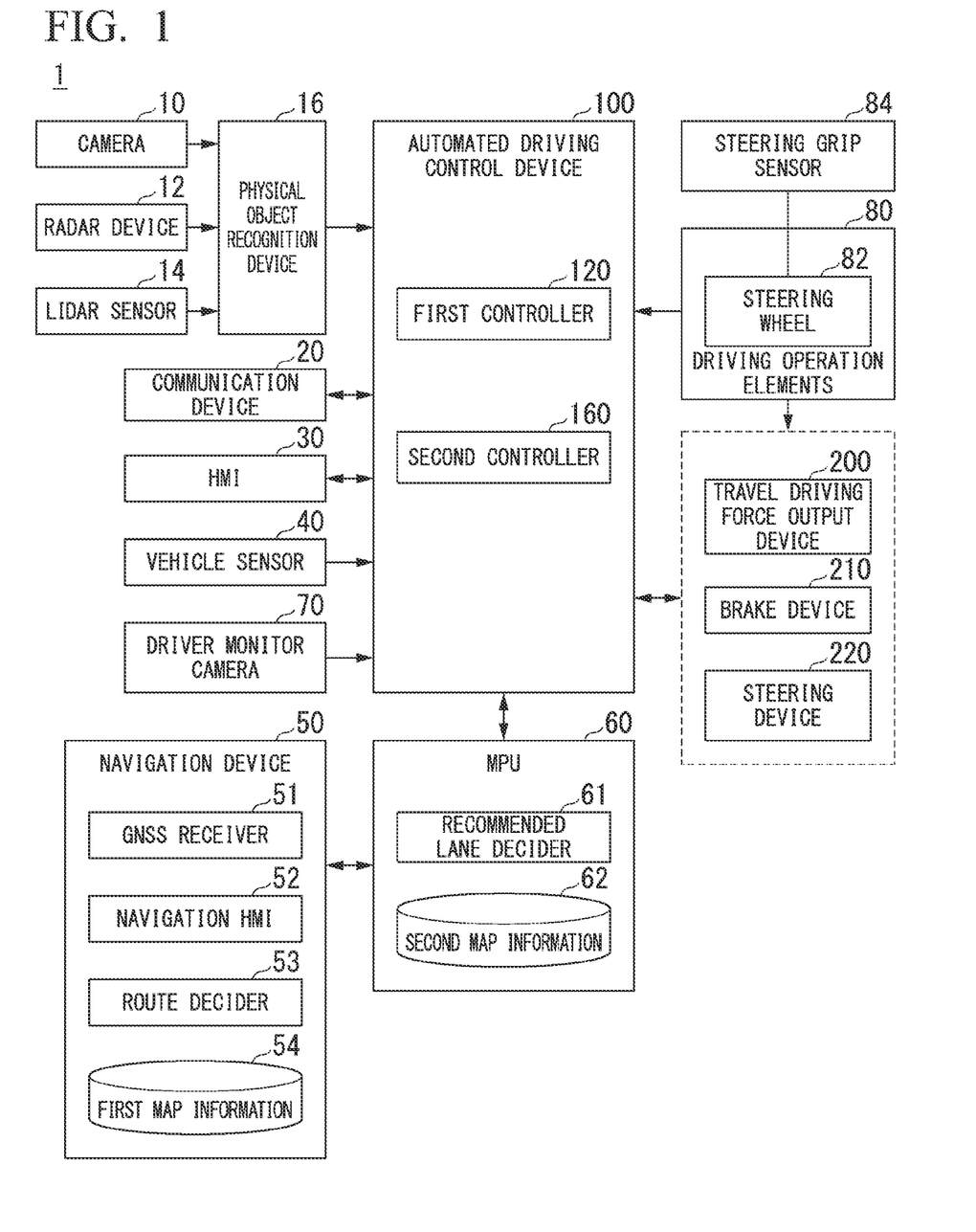
FIG. 1 is a configuration diagram of a vehicle system 1 using a vehicle control device according to an embodiment.

FIG. 1 is a configuration diagram of a vehicle system 1 using the vehicle control device according to the present embodiment. A vehicle in which the vehicle system 1 is mounted is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination thereof. The electric motor operates using electric power generated by a power generator connected to the internal combustion engine or electric power that is supplied when a secondary battery or a fuel cell is discharged.

For example, the vehicle system 1 includes a camera 10, a radar device 12, a light detection and ranging (LIDAR) sensor 14, a physical object recognition device 16, a communication device 20, a human machine interface (HMI) 30, a vehicle sensor 40, a navigation device 50, a map positioning unit (MPU) 60, a driver monitor camera 70, driving operation elements 80, an automated driving control device 100, a travel driving force output device 200, a brake device 210, and a steering device 220. Such devices and equipment are connected to each other by a multiplex communication line such as a controller area network (CAN) communication line, a serial communication line, or a wireless communication network. Also, the configuration shown in FIG. 1 is merely an example and some of the components may be omitted or other components may be further added.

For example, the camera 10 is a digital camera using a solid-state imaging element such as a charge-coupled device (CCD) or a complementary metal oxide semiconductor (CMOS). The camera 10 is attached to any location on the vehicle (hereinafter, a host vehicle M) in which the vehicle system 1 is mounted. When the view in front of the host vehicle M is imaged, the camera 10 is attached to an upper part of a front windshield, a rear surface of a rearview mirror, or the like. For example, the camera 10 periodically and iteratively images the surroundings of the host vehicle M. The camera 10 may be a stereo camera.

The radar device 12 radiates radio waves such as millimeter waves around the host vehicle M and detects at least a position (a distance to and a direction) of a physical object by detecting radio waves (reflected waves) reflected by the physical object. The radar device 12 is attached to any location on the host vehicle M. The radar device 12 may detect a position and speed of the physical object in a frequency modulated continuous wave (FM-CW) scheme.

The LIDAR sensor 14 radiates light (or electromagnetic waves of a wavelength close to an optical wavelength) to the vicinity of the host vehicle M and measures scattered light. The LIDAR sensor 14 detects a distance to an object on the basis of a period of time from light emission to light reception. The radiated light is, for example, pulsed laser light. The LIDAR sensor 14 is attached to any location on the host vehicle M.

The physical object recognition device 16 performs a sensor fusion process on detection results from some or all of the camera 10, the radar device 12, and the LIDAR sensor 14 to recognize a position, a type, a speed, and the like of a physical object. The physical object recognition device 16 outputs recognition results to the automated driving control device 100. The physical object recognition device 16 may output detection results of the camera 10, the radar device 12, and the LIDAR sensor 14 to the automated driving control device 100 as they are. The physical object recognition device 16 may be omitted from the vehicle system 1.

The communication device 20 communicates with another vehicle located in the vicinity of the host vehicle M using, for example, a cellular network, a Wi-Fi network, Bluetooth (registered trademark), dedicated short range communication (DSRC), or the like, or communicates with various types of server devices via a radio base station.

The HMI 30 provides an occupant of the host vehicle M with various types of information and receives an input operation from the occupant. The HMI 30 includes various types of display devices, a speaker, a buzzer, a touch panel, a switch, a key, and the like.

The vehicle sensor 40 includes a vehicle speed sensor configured to detect the speed of the host vehicle M, an acceleration sensor configured to detect acceleration, a yaw rate sensor configured to detect an angular speed around a vertical axis, a direction sensor configured to detect a direction of the host vehicle M, and the like.

For example, the navigation device 50 includes a global navigation satellite system (GNSS) receiver 51, a navigation HMI 52, and a route decider 53. The navigation device 50 stores first map information 54 in a storage device such as a hard disk drive (HDD) or a flash memory. The GNSS receiver 51 identifies a position of the host vehicle M on the basis of a signal received from a GNSS satellite. The position of the host vehicle M may be identified or corrected by an inertial navigation system (INS) using an output of the vehicle sensor 40. The navigation HMI 52 includes a display device, a speaker, a touch panel, keys, and the like. The navigation HMI 52 may be partly or wholly shared with the above-described HMI 30. For example, the route decider 53 decides on a route (hereinafter referred to as a route on a map) from the position of the host vehicle M identified by the GNSS receiver 51 (or any input position) to a destination input by the occupant using the navigation HMI 52 with reference to the first map information 54. The first map information 54 is, for example, information in which a road shape is expressed by a link indicating a road and nodes connected by the link. The first map information 54 may include curvature of a road, point of interest (POI) information, and the like. The route on the map is output to the MPU 60. The navigation device 50 may perform route guidance using the navigation HMI 52 on the basis of the route on the map. The navigation device 50 may be implemented, for example, according to a function of a terminal device such as a smartphone or a tablet terminal possessed by the occupant. The navigation device 50 may transmit a current position and a destination to a navigation server via the communication device 20 and acquire a route equivalent to the route on the map from the navigation server.

For example, the MPU 60 includes a recommended lane decider 61 and stores second map information 62 in a storage device such as an HDD or a flash memory. The recommended lane decider 61 divides the route on the map provided from the navigation device 50 into a plurality of blocks (for example, divides the route every 100 [m] in a travel direction of the vehicle), and decides on a recommended lane for each block with reference to the second map information 62. The recommended lane decider 61 decides in what lane numbered from the left the vehicle will travel. The recommended lane decider 61 decides on the recommended lane so that the host vehicle M can travel along a reasonable route for traveling to a branching destination when there is a branch point on the route on the map.

The second map information 62 is map information which has higher accuracy than the first map information 54. For example, the second map information 62 includes information about a center of a lane, information about a boundary of a lane, and the like. In particular, in the present embodiment, the second map information 62 includes information about the left and right road markings (hereinafter sometimes referred to as "map road markings") and a lane centerline (hereinafter sometimes referred to as a "map road centerline") in a lane. Also, the second map information 62 may include road information, traffic regulations information, address information (an address/postal code), facility information, telephone number information, information of a prohibition segment in which mode A or B to be described below is prohibited, and the like. The second map information 62 may be updated at any time when the communication device 20 communicates with another device.

The driver monitor camera 70 is, for example, a digital camera that uses a solid-state image sensor such as a CCD or a CMOS. The driver monitor camera 70 is attached to any location on the host vehicle M with respect to a position and a direction where the head of the occupant (hereinafter, the driver) sitting in the driver's seat of the host vehicle M can be imaged from the front (in a direction in which his/her face is imaged). For example, the driver monitor camera 70 is attached to an upper part of a display device provided on the central portion of the instrument panel of the host vehicle M.

For example, the driving operation elements 80 include an accelerator pedal, a brake pedal, a shift lever, and other operation elements in addition to a steering wheel 82. A sensor configured to detect an amount of operation or the presence or absence of an operation is attached to the driving operation element 80 and a detection result of the sensor is output to the automated driving control device 100 or some or all of the travel driving force output device 200, the brake device 210, and the steering device 220. The steering wheel 82 is an example of an "operation element that receives a steering operation by the driver." The operation element does not necessarily have to be annular and may be in the form of a variant steering wheel, a joystick, a button, or the like. A steering grip sensor 84 is attached to the steering wheel 82. The steering grip sensor 84 is implemented by a capacitance sensor or the like and outputs a signal for detecting whether or not the driver is gripping the steering wheel 82 (indicating that the driver is in contact with the steering wheel 82 in a state in which a force is applied) to the automated driving control device 100.

The automated driving control device 100 includes, for example, a first controller 120 and a second controller 160. Each of the first controller 120 and the second controller 160 is implemented, for example, by a hardware processor such as a central processor (CPU) executing a program (software). Some or all of the above components may be implemented by hardware (including a circuit; circuitry) such as a large-scale integration (LSI) circuit, an application-specific integrated circuit (ASIC), a field-programmable gate array (FPGA), or a graphics processor (GPU) or may be implemented by software and hardware in cooperation. The program may be pre-stored in a storage device (a storage device including a non-transitory storage medium) such as an HDD or a flash memory of the automated driving control device 100 or may be stored in a removable storage medium such as a DVD or a CD-ROM and installed in the HDD or the flash memory of the automated driving control device 100 when the storage medium (the non-transitory storage medium) is mounted in a drive device. The automated driving control device 100 is an example of a "vehicle control device" and a combination of the action plan generator 140 and the second controller 160 is an example of a "driving controller."

Figure 2:
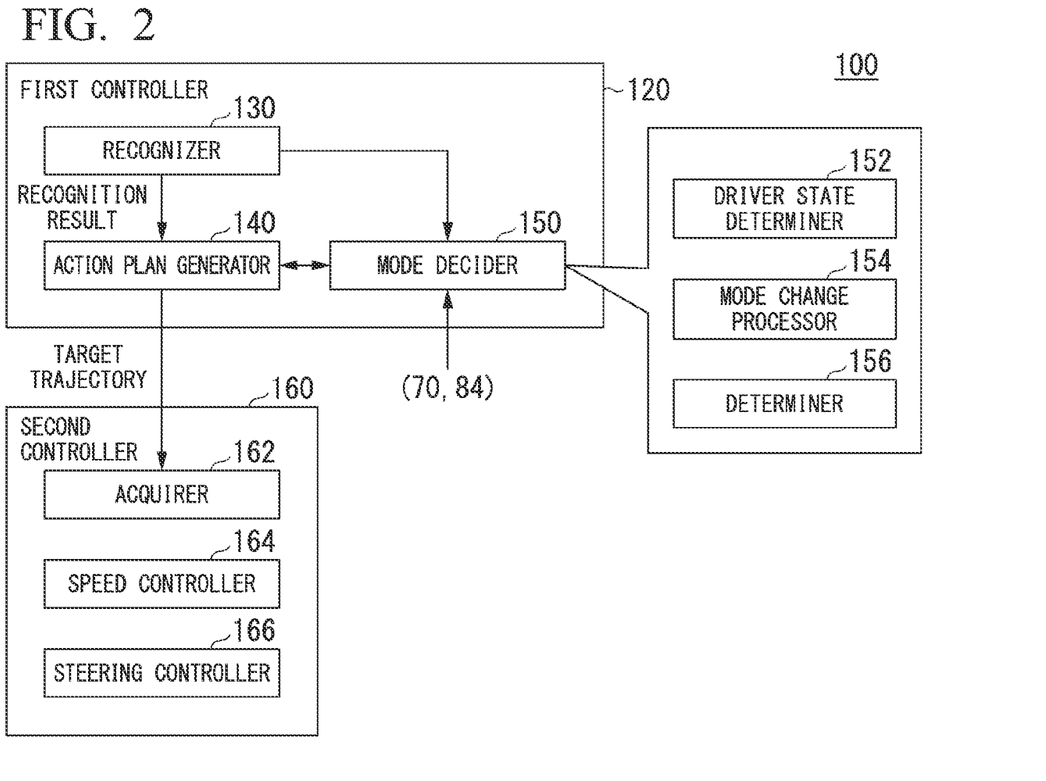
FIG. 2 is a functional configuration diagram of a first controller and a second controller.

FIG. 2 is a functional configuration diagram of the first controller 120 and the second controller 160. The first controller 120 includes, for example, a recognizer 130, the action plan generator 140, and a mode decider 150. For example, the first controller 120 implements a function based on artificial intelligence (AI) and a function based on a previously given model in parallel. For example, an "intersection recognition" function may be implemented by executing intersection recognition based on deep learning or the like and recognition based on previously given conditions (signals, road markings, or the like, with which pattern matching is possible) in parallel and performing comprehensive evaluation by assigning scores to both recognitions. Thereby, the reliability of automated driving is secured.

The recognizer 130 recognizes states of positions, speeds, acceleration, and the like of physical objects near the host vehicle M on the basis of information input from the camera 10, the radar device 12, and the LIDAR sensor 14 via the physical object recognition device 16. For example, the position of the physical object is recognized as a position on absolute coordinates with a representative point (a center of gravity, a driving shaft center, or the like) of the host vehicle M as the origin and is used for control. The position of the physical object may be represented by a representative point such as a center of gravity or a corner of the physical object or may be represented by an area. The "state" of a physical object may include acceleration or jerk of the physical object or an "action state" (for example, whether or not a lane change is being made or intended).

Also, for example, the recognizer 130 recognizes a lane in which the host vehicle M is traveling (a travel lane). For example, the recognizer 130 recognizes the travel lane by comparing a pattern of road markings (for example, an arrangement of solid lines and broken lines) obtained from the second map information 62 with a pattern of road markings in the vicinity of the host vehicle M recognized from an image captured by the camera 10. In particular, in the present embodiment, the recognizer 130 recognizes left and right road markings (hereinafter sometimes referred to as "camera road markings") and a lane centerline (hereinafter referred to as a "camera road centerline") in a lane on the basis of the image captured by the camera 10. The camera road centerline is recognized as the centerline of the left and right camera road markings. In this recognition, a position of the host vehicle M acquired from the navigation device 50 or a processing result of the INS may be taken into account. Furthermore, in the present embodiment, the recognizer 130 recognizes continuous road structures such as shoulders, curbs, fences, medians, and guardrails located on the road on the basis of outputs of the radar device 12 and/or the LIDAR sensor 14. Also, the recognizer 130 recognizes a temporary stop line, an obstacle, red traffic light, a toll gate, and other road events.

When the travel lane is recognized, the recognizer 130 recognizes a position or an orientation of the host vehicle M with respect to the travel lane. For example, the recognizer 130 may recognize a gap of a reference point of the host vehicle M from the center of the lane and an angle formed between the travel direction of the host vehicle M and a line connected to the center of the lane as a relative position and orientation of the host vehicle M related to the travel lane. Alternatively, the recognizer 130 may recognize a position of the reference point of the host vehicle M related to one side end portion (a road marking or a road boundary) of the travel lane or the like as a relative position of the host vehicle M related to the travel lane.

The recognizer 130 further recognizes a free space that is a region where the host vehicle M can travel in the travel lane on the basis of the image captured by the camera 10. More specifically, for example, when an image is input, the recognizer 130 obtains a free space by inputting an image captured by the camera 10 to a trained model trained to output the free space shown in the image. The free space is output, for example, as the left and right runway boundary lines (or a point group constituting a runway boundary line) that sandwich the current position of the host vehicle M.

The action plan generator 140 generates a future target trajectory along which the host vehicle M will automatically travel (independently of the driver's operation) so that the host vehicle M can generally travel in the recommended lane determined by the recommended lane decider 61 and further cope with a surrounding situation of the host vehicle M. For example, the target trajectory includes a speed element. For example, the target trajectory is represented by sequentially arranging points (trajectory points) at which the host vehicle M is required to arrive. The trajectory points are points at which the host vehicle M is required to arrive for each prescribed traveling distance (for example, about several meters [m]) along a road. In addition, a target speed and target acceleration for each prescribed sampling time (for example, about 0.x [sec] where x is a decimal number) are generated as parts of the target trajectory. Also, the trajectory point may be a position where the host vehicle M is required to arrive at the sampling time for each prescribed sampling time. In this case, information of the target speed or the target acceleration is represented by an interval between the trajectory points.

The action plan generator 140 may set an automated driving event when a target trajectory is generated. Automated driving events include a constant-speed traveling event, a low-speed tracking traveling event, a lane change event, a branch-point-related movement event, a merging-point-related movement event, a takeover event, and the like. The action plan generator 140 generates a target trajectory according to an activated event.

The mode decider 150 decides on a driving mode of the host vehicle M as one of a plurality of driving modes. The plurality of driving modes have different tasks imposed on the driver. The mode decider 150 includes, for example, a driver state determiner 152, a mode change processor 154, and a determiner 156. These individual functions will be described below.

Figure 3:
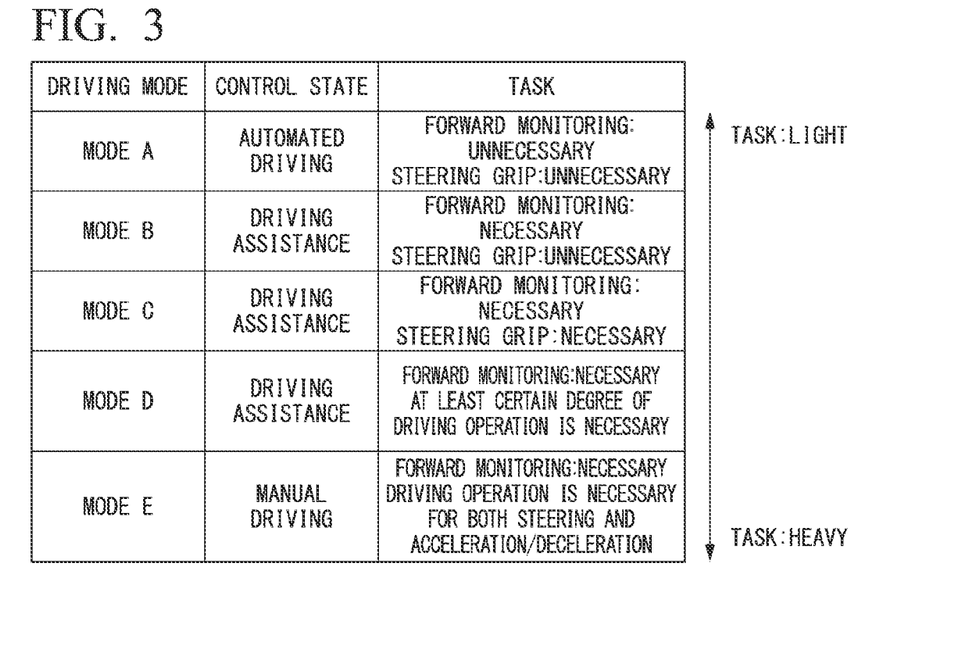
FIG. 3 is a diagram showing an example of corresponding relationships between driving modes, control states of a host vehicle M, and tasks.

FIG. 3 is a diagram showing an example of corresponding relationships between the driving modes, the control states of the host vehicle M, and the tasks. For example, there are five modes from mode A to mode E as the driving modes of the host vehicle M. A control state, i.e., a degree of automation of the driving control of the host vehicle M, is highest in mode A, lower in the order of mode B, mode C, and mode D, and lowest in mode E. In contrast, a task imposed on the driver is lightest in mode A, heavier in the order of mode B, mode C, and mode D, and heaviest in mode E. Because of a control state that is not automated driving in modes D and E, the automated driving control device 100 is responsible for ending control related to automated driving and shifting the driving mode to driving assistance or manual driving. The content of the driving modes will be exemplified below.

In mode A, in an automated driving state, neither forward monitoring nor gripping of the steering wheel 82 (a steering grip in FIG. 3) is imposed on the driver. However, even in mode A, the driver is required to be in a posture where the fast shift to manual driving is enabled in response to a request from the system centered on the automated driving control device 100. The term "automated driving" as used herein indicates that both steering and acceleration/deceleration are controlled independently of the operation of the driver. The term "forward region or direction" indicates a space in a travel direction of the host vehicle M that is visually recognized via the front windshield. Mode A is, for example, a driving mode in which the host vehicle M travels at a prescribed speed (for example, about 50 [km/h]) or lower on a motorway such as an expressway and which can be executed when a condition in which there is a tracking target preceding vehicle or the like is satisfied. Mode A may be referred to as a traffic jam pilot (TJP). When this condition is no longer satisfied, the mode decider 150 changes the driving mode of the host vehicle M to mode B.

In mode B, in a driving assistance state, a task of monitoring a forward direction of the host vehicle M (hereinafter referred to as forward monitoring) is imposed on the driver, but a task of gripping the steering wheel 82 is not imposed on the driver. In mode C, in a driving assistance state, a forward monitoring task and a task of gripping the steering wheel 82 are imposed on the driver. In mode D, a task in which a certain degree of driving operation is required for at least one of steering and acceleration/deceleration of the host vehicle M is imposed on the driver. For example, in mode D, driving assistance such as adaptive cruise control (ACC) or a lane keeping assist system (LKAS) is performed. In mode E, manual driving in which a task requiring a driving operation for both steering and acceleration/deceleration is imposed on the driver is performed. In both modes D and E, a task of monitoring a forward direction of the host vehicle M is naturally imposed on the driver.

The automated driving control device 100 (and the driving assistance device (not shown)) makes an automated lane change corresponding to the driving mode. Automated lane changes include an automated lane change (1) due to a system request and an automated lane change (2) due to a driver request. Examples of the automated lane change (1) include an automated lane change for passing performed when the speed of the preceding vehicle is less than the speed of the host vehicle by a reference level or higher and an automated lane change for traveling toward a destination (an automated lane change based on a change in a recommended lane). In the automated lane change (2), if a condition related to a speed, a positional relationship associated with a nearby vehicle, or the like is satisfied, the host vehicle M is allowed to change the lane in an operation direction when a direction indicator has been operated by the driver.

The automated driving control device 100 does not execute either of the automated lane changes (1) and (2) in mode A. The automated driving control device 100 executes both automated lane changes (1) and (2) in modes B and C. The driving assistance device (not shown) does not execute the automated lane change (1) but executes the automated lane change (2) in mode D. In mode E, neither of the automated lane changes (1) and (2) is executed.

The mode decider 150 changes the driving mode of the host vehicle M to a driving mode in which a task is heavier when the task associated with the decided driving mode (hereinafter referred to as a current driving mode) is not executed by the driver.

For example, in mode A, when the driver is in a posture where he/she cannot shift the driving to manual driving in response to a request from the system (for example, when he/she continues to look outside an allowable area or when a sign that driving is difficult is detected), the mode decider 150 performs a control process of prompting the driver to shift the driving to manual driving using the HMI 30, causing the host vehicle M to gradually stop close to the road shoulder when the driver does not respond, and stopping the automated driving. After the automated driving is stopped, the host vehicle M is in a state of mode D or E. Thereby, the host vehicle M can be started according to the manual driving of the driver. Hereinafter, the same is true for "stopping of automated driving." When the driver is not performing forward monitoring in mode B, the mode decider 150 performs a control process of prompting the driver to perform the forward monitoring using the HMI 30, causing the host vehicle M to gradually stop close to the road shoulder when the driver does not respond, and stopping the automated driving. When the driver is not performing forward monitoring or is not gripping the steering wheel 82 in mode C, the mode decider 150 performs a control process of prompting the driver to perform the forward monitoring and/or grip the steering wheel 82 using the HMI 30, causing the host vehicle M to gradually stop close to the road shoulder when the driver does not respond, and stopping the automated driving.

The driver state determiner 152 monitors the driver's state for the above-described mode change and determines whether or not the driver's state corresponds to the task. For example, the driver state determiner 152 performs a posture estimation process by analyzing the image captured by the driver monitor camera 70 and determines whether or not the driver is in a posture in which it is difficult to shift the driving to manual driving in response to a request from the system. The driver state determiner 152 performs a visual line estimation process by analyzing the image captured by the driver monitor camera 70 and determines whether or not the driver is performing forward monitoring.

The mode change processor 154 performs various types of processes for the mode change. For example, the mode change processor 154 instructs the action plan generator 140 to generate a target trajectory for stopping on the road shoulder, instructs a driving assistance device (not shown) to operate, or controls the HMI 30 for instructing the driver to take an action. An operation of the determiner 156 will be described below.

The second controller 160 controls the travel driving force output device 200, the brake device 210, and the steering device 220 so that the host vehicle M passes along the target trajectory generated by the action plan generator 140 at the scheduled times.

Returning to FIG. 2, the second controller 160 includes, for example, an acquirer 162, a speed controller 164, and a steering controller 166. The acquirer 162 acquires information of a target trajectory (trajectory points) generated by the action plan generator 140 and causes a memory (not shown) to store the information. The speed controller 164 controls the travel driving force output device 200 or the brake device 210 on the basis of a speed element associated with the target trajectory stored in the memory. The steering controller 166 controls the steering device 220 in accordance with a degree of curvature of the target trajectory stored in the memory. The processes of the speed controller 164 and the steering controller 166 are implemented by, for example, a combination of feedforward control and feedback control. As an example, the steering controller 166 executes feedforward control according to the curvature of the road in front of the host vehicle M and feedback control based on deviation from the target trajectory in combination.

The travel driving force output device 200 outputs a travel driving force (torque) for enabling the traveling of the vehicle to driving wheels. For example, the travel driving force output device 200 includes a combination of an internal combustion engine, an electric motor, a transmission, and the like, and an electronic controller (ECU) that controls the internal combustion engine, the electric motor, the transmission, and the like. The ECU controls the above-described components in accordance with information input from the second controller 160 or information input from the driving operation element 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the second controller 160 or the information input from the driving operation element 80 so that brake torque according to a braking operation is output to each wheel. The brake device 210 may include a mechanism configured to transfer the hydraulic pressure generated according to an operation on the brake pedal included in the driving operation elements 80 to the cylinder via a master cylinder as a backup. Also, the brake device 210 is not limited to the above-described configuration and may be an electronically controlled hydraulic brake device configured to control an actuator in accordance with information input from the second controller 160 and transfer the hydraulic pressure of the master cylinder to the cylinder.

For example, the steering device 220 includes a steering ECU and an electric motor. For example, the electric motor changes a direction of steerable wheels by applying a force to a rack and pinion mechanism. The steering ECU drives the electric motor in accordance with the information input from the second controller 160 or the information input from the driving operation element 80 to change the direction of the steerable wheels.

Figure 4:
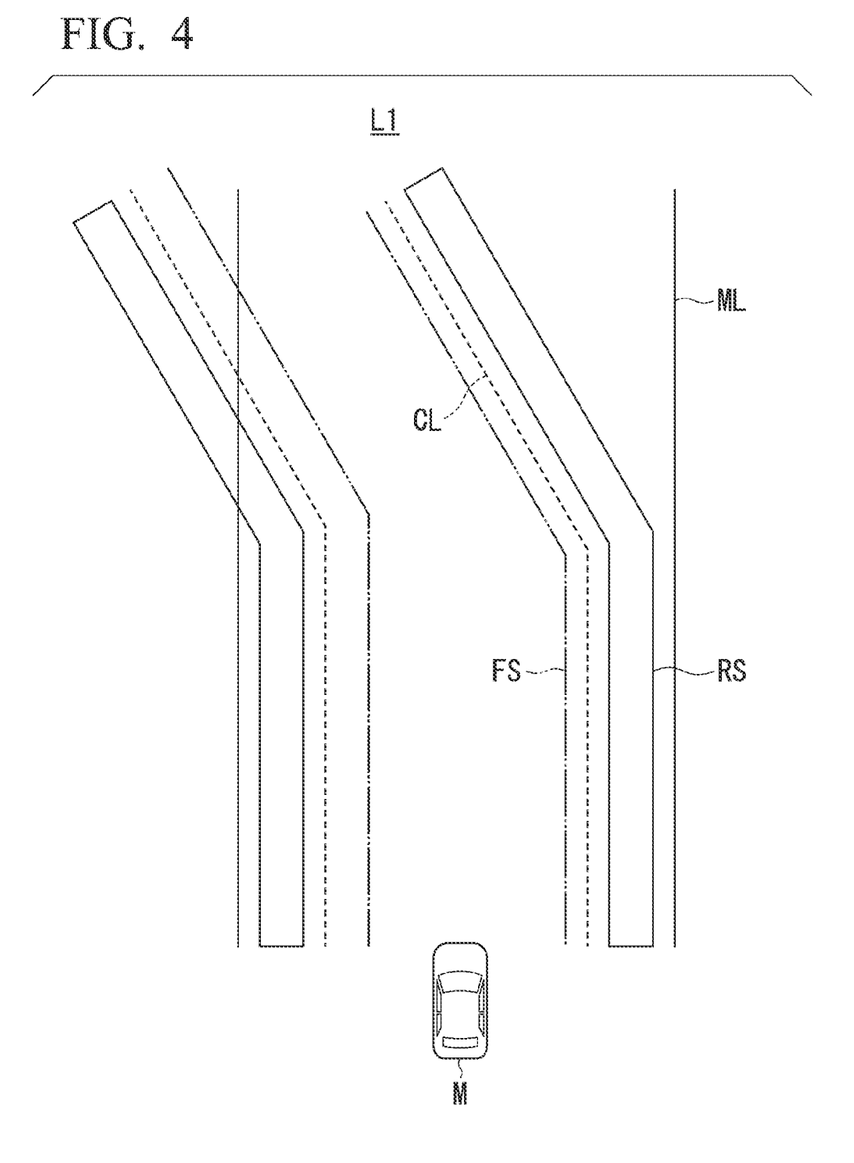
FIG. 4 is a diagram showing an example of a situation in which an operation of the vehicle control device according to the embodiment is executed.

Next, an operation of the vehicle control device according to the embodiment will be described. FIG. 4 is a diagram showing an example of a situation in which the operation of the vehicle control device according to the embodiment is executed. In the situation shown in FIG. 4, it is assumed that the driving mode of the host vehicle M is mode B and the host vehicle M is traveling in a lane L1 with a map road centerline included in the second map information 62 as a reference line (namely, along a map road centerline). In FIG. 4, reference sign ML denotes a map road marking, reference sign CL indicates a camera road marking, reference sign FS denotes a free space, and reference sign RS denotes a continuous road structure.

The determiner 156 determines whether or not the camera road marking CL recognized on the basis of an image captured by the camera 10 matches the map road marking ML included in the second map information 62. More specifically, for example, the determiner 156 determines whether or not a distance between the camera road marking CL and the map road marking ML is less than or equal to a threshold value with respect to each of the camera road marking CL and the map road marking ML on the left side and the camera road marking CL and the map road marking ML on the right side. For example, when the distance between the camera road marking CL and the map road marking ML on at least one side is greater than the threshold value, the determiner 156 determines that the camera road marking CL and the map road marking ML do not match. Also, for example, the determiner 156 may determine whether or not an angle formed by the camera road marking CL and the map road marking ML is less than or equal to a threshold value with respect to each of the camera road marking CL and the map road marking ML on the left side and the camera road marking CL and the map road marking ML on the right side. The determiner 156 may determine that the camera road marking CL and the map road marking ML do not match when the angle between the camera road marking CL and the map road marking ML on at least one side is greater than the threshold value.

When the determiner 156 determines that the camera road marking CL and the map road marking ML do not match, the determiner 156 determines whether or not the following first, second, and third conditions are all satisfied. The first condition, the second condition, and the third condition are conditions for determining which of the camera road marking CL and the map road marking ML is more reliable. When it is determined that the first condition, the second condition, and the third condition are all satisfied, this indicates that the camera road marking CL is more reliable than the map road marking ML.

[First Condition]

The determiner 156 determines whether or not information of the continuous road structure RS detected by the radar device 12 and/or the LIDAR sensor 14 matches information of the free space FS recognized by the recognizer 130 as the first condition. More specifically, the determiner 156 calculates an angle between an extension direction of the continuous road structure RS and an extension direction of the free space FS and determines whether or not the calculated angle is less than or equal to a first threshold value. The determiner 156 calculates, for example, an angle between a straight line fitted to the continuous road structure RS and the extension direction of the free space FS, and determines whether the calculated angle is less than or equal to the first threshold value. When it is determined that the calculated angle is less than or equal to the first threshold value, the determiner 156 determines that the information of the continuous road structure RS matches the information of the free space FS recognized by the recognizer 130.

[Second Condition]

The determiner 156 determines whether or not the camera road marking CL and the information of the free space FS match as the second condition. More specifically, the determiner 156 calculates an angle between the camera road marking CL and the extension direction of the free space FS and determines whether or not the calculated angle is less than or equal to a second threshold value. When it is determined that the calculated angle is less than or equal to the second threshold value, the determiner 156 determines that the camera road marking CL and the information of the free space FS match.

[Third Condition]

The determiner 156 determines whether or not there is interference between the information of the continuous road structure RS and the map road marking ML as the third condition. More specifically, for example, the determiner 156 determines whether or not the continuous road structure RS (or a straight line fitted to the continuous road structure RS) intersects the map road marking ML. When it is determined that the continuous road structure RS intersects the map road marking ML, the determiner 156 determines that there is interference between the information of the continuous road structure RS and the map road marking ML.

When it is determined that the first condition, the second condition, and the third condition are all satisfied, the mode decider 150 determines that the camera road marking CL is more reliable than the map road marking ML and changes the driving mode from the driving mode of mode B referring to the map road centerline to the driving mode of mode C referring to the camera road centerline (i.e., the camera road centerline is designated as a reference line). More specifically, when a period in which it is determined that the first condition, the second condition, and the third condition are all satisfied continues for a first period or longer, the mode decider 150 changes the driving mode from the driving mode of mode B referring to the map road centerline to the driving mode of mode C referring to the camera road centerline. On the other hand, when it is determined that any one of the first condition, the second condition, and the third condition is not satisfied, the mode decider 150 does not determine that the camera road marking CL is more reliable than the map road marking ML and continues the driving mode of mode B referring to the map road centerline.

Figure 5:
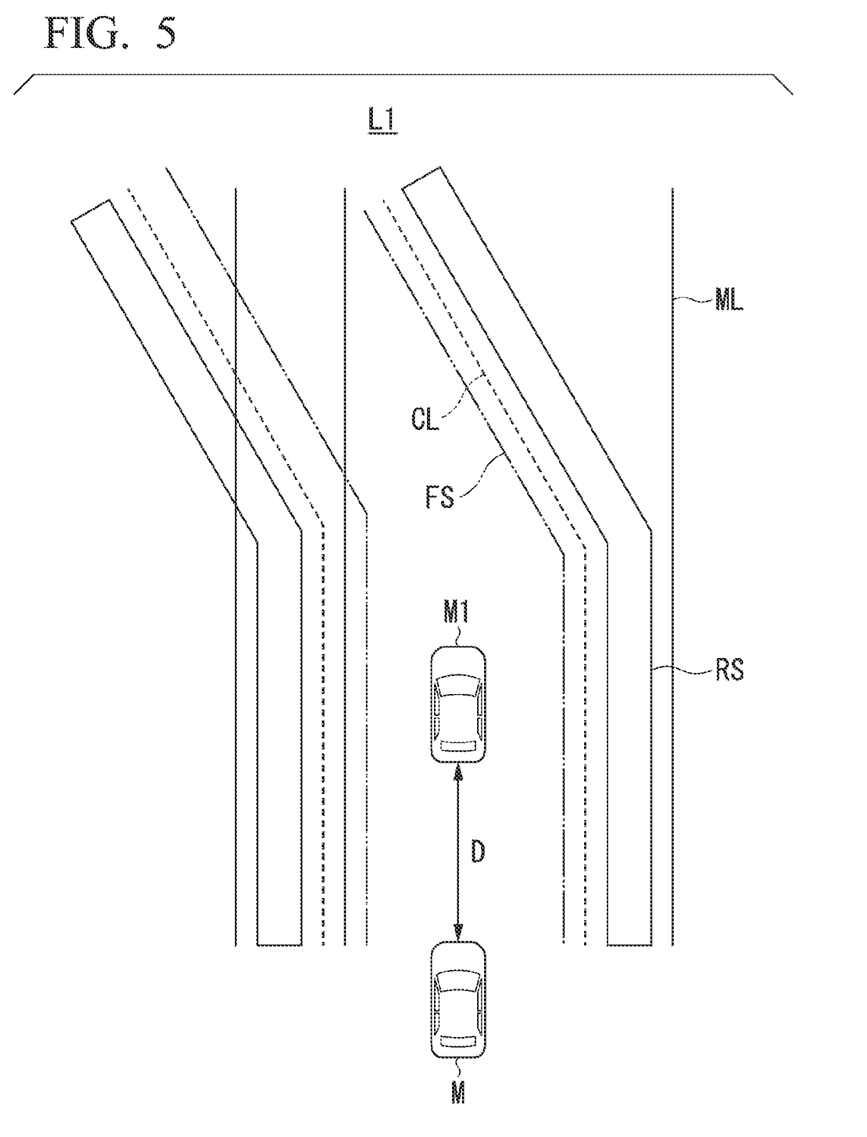
FIG. 5 is a diagram showing another example of a situation in which an operation of the vehicle control device according to the embodiment is executed.

Also, even if the first condition, the second condition, and the third condition are all satisfied, the driving mode of mode B may continue when a preceding vehicle M1 is located within a prescribed distance D with respect to the travel direction of the host vehicle M. FIG. 5 shows another example of a situation in which the operation of the vehicle control device according to the embodiment is executed. FIG. 5 shows a situation in which the first condition, the second condition, and the third condition are all satisfied while the host vehicle M is traveling in the driving mode of mode B referring to the map road centerline.

As shown in FIG. 5, when it is determined that the first condition, the second condition, and the third condition are all satisfied, the mode decider 150 determines whether or not the preceding vehicle M1 is located within the prescribed distance D with respect to the travel direction of the host vehicle M. When it is determined that the preceding vehicle M1 is located within the prescribed distance D, the mode decider 150 continues the driving mode of mode B referring to the travel trajectory of the preceding vehicle M1 (i.e., the travel trajectory of the preceding vehicle M1 is designated as a reference line). Also, for example, the mode decider 150 may calculate an average line between the travel trajectory of the preceding vehicle M1 and the camera road centerline determined to have higher reliability and continue the driving mode of mode B in which the calculated average line is designated as a reference line.

When the driving mode is changed from the driving mode of mode B referring to the map road centerline to the driving mode of mode C referring to the camera road centerline, the mode decider 150 causes the driving mode of mode C to continue for at least a second prescribed period. This is because hunting may occur in the driving mode and the occupant of the host vehicle M may be given an unpleasant feeling if the driving mode is immediately returned to mode B in accordance with the fact that any one of the first, second, and third conditions is no longer satisfied.

Thus, after the mode decider 150 causes the driving mode of mode C referring to the camera road centerline to continue for a second prescribed period, the determiner 156 determines again whether or not the first condition, the second condition, and the third condition are all satisfied. When it is determined that any one of the first condition, the second condition, and the third condition is not satisfied, the mode decider 150 causes the driving mode to return from the driving mode of mode C referring to the camera road centerline to the driving mode of mode B referring to the map road centerline.

Also, when a third prescribed period longer than the second prescribed period has elapsed after the driving mode was changed from the driving mode of mode B referring to the map road centerline to the driving mode of mode C referring to the camera road centerline, the mode decider 150 determines again whether or not the first condition, the second condition, and the third condition are all satisfied. When the first condition, the second condition, and the third condition are all satisfied, the mode decider 150 changes the driving mode from the driving mode of mode C to the driving mode of mode D or E. That is, when a period during which it is estimated that there is an error in the second map information 62 continues for a long time, it is possible to execute operation control more suitable for the situation by changing the driving mode to a driving mode of a heavier task, Also, in the above description, each of the first prescribed period, the second prescribed period, and the third prescribed period for use in the determination may correspond to a continuous travel distance of the host vehicle M. For example, when the host vehicle M continuously travels a first prescribed distance or longer while the first condition, the second condition, and the third condition are all satisfied, the mode decider 150 may determine that the camera road marking CL is more reliable than the map road marking ML and may change the driving mode from the driving mode of mode B referring to the map road centerline to the driving mode of mode C referring to the camera road centerline. Also, for example, when the driving mode is changed from the driving mode of mode B referring to the map road centerline to the driving mode of mode C referring to the camera road centerline, the mode decider 150 may cause the driving mode of mode C to continue at least until the host vehicle M continuously travels for a second prescribed distance. Also, for example, when the host vehicle M travels a third prescribed distance longer than the second prescribed distance after the driving mode is changed from the driving mode of mode B referring to the map road centerline to the driving mode of mode C referring to the camera road centerline, the mode decider 150 may determine whether or not the first condition, the second condition, and the third condition are all satisfied.

Figure 6:
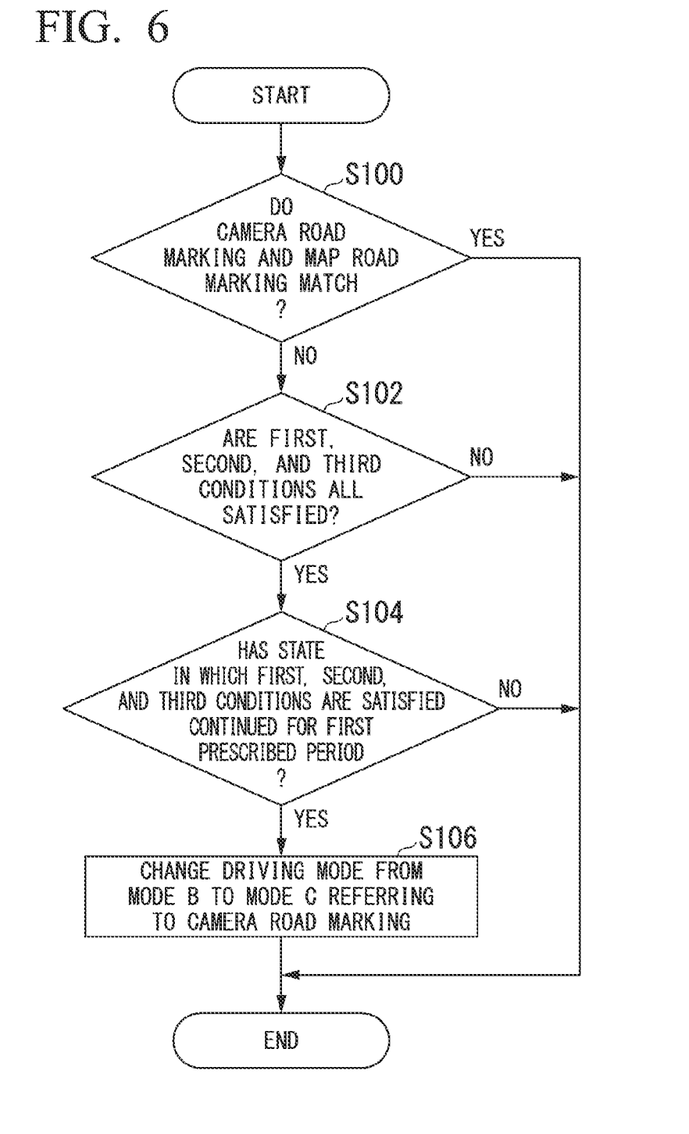
FIG. 6 is a flowchart showing an example of a flow of a process executed by the vehicle control device according to the embodiment.

Next, a flow of a process executed by the vehicle control device according to the embodiment will be described with reference to FIGS. 6 to 8. FIG. 6 is a flowchart showing an example of a flow of a process executed by the vehicle control device according to the embodiment. The process shown in FIG. 6 is iteratively executed while the host vehicle M is traveling in the driving mode of mode B referring to the map road centerline.

First, the determiner 156 determines whether or not the camera road marking CL and the map road marking ML match (step S100). When it is determined that the camera road marking CL and the map road marking ML match, the determiner 156 ends the process of the present flowchart. On the other hand, when it is determined that the camera road marking CL and the map road marking ML do not match, the determiner 156 determines whether or not the first condition, the second condition, and the third condition are all satisfied (step S102). When it is determined that any one of the first condition, the second condition, and the third condition is not satisfied, the determiner 156 ends the process of the flowchart.

On the other hand, when it is determined that the first condition, the second condition, and the third condition are all satisfied, the determiner 156 subsequently determines whether or not a state in which the first condition, the second condition, and the third condition are all satisfied has continued for a first prescribed period (step S104). When it is determined that the state in which the first condition, the second condition, and the third condition are all satisfied has not continued for a first prescribed period, the determiner 156 ends the process of the flowchart. On the other hand, when it is determined that the state in which the first condition, the second condition, and the third condition are all satisfied has continued for the first prescribed period, the mode decider 150 changes the driving mode from the driving mode of mode B referring to the map road centerline to the driving mode of mode C referring to the camera road centerline. With this, the process of the present flowchart ends.

Also, in step S100 of the flowchart shown in FIG. 6, the determiner 156 determines whether or not a camera road marking CL and a map road marking ML match. However, the present invention is not limited to such a configuration. The determiner 156 may determine whether or not the camera road marking CL and the map road marking ML match and whether or not the current position of the host vehicle M is within a prescribed region where the reliability of the camera road marking CL is assumed to be low and make the determination relating to the first to third conditions in step S102 when the camera road marking CL and the map road marking ML do not match and the current position of the host vehicle M is within the prescribed region where the reliability of the camera road marking CL is assumed to be low. Because the determination relating to the first to third conditions is the determination for confirming the reliability of the camera road marking CL, it is useful to make the determination when the current position of the host vehicle M is within the prescribed region where the reliability of the camera road marking CL is assumed to be low.

A prescribed region where the reliability of the camera road marking CL is assumed to be low includes, for example, a branch road, an intersection, and a merging segment (and peripheral regions thereof), and is stored in the second map information 62 in advance. The determiner 156 can determine whether or not the current position of the host vehicle M is within the prescribed region where the reliability of the camera road marking CL is assumed to be low with reference to the second map information 62 including position information of a prescribed region where the reliability of the camera road marking CL is assumed to be low. The determiner 156 may determine whether or not the current position of the host vehicle M is within a prescribed region where the reliability of the camera road marking CL is assumed to be low even if the camera road marking CL and the map road marking ML match and execute the processing of steps S102 to S106 when it is determined that the current position of the host vehicle M is within the prescribed region.

Figure 7:
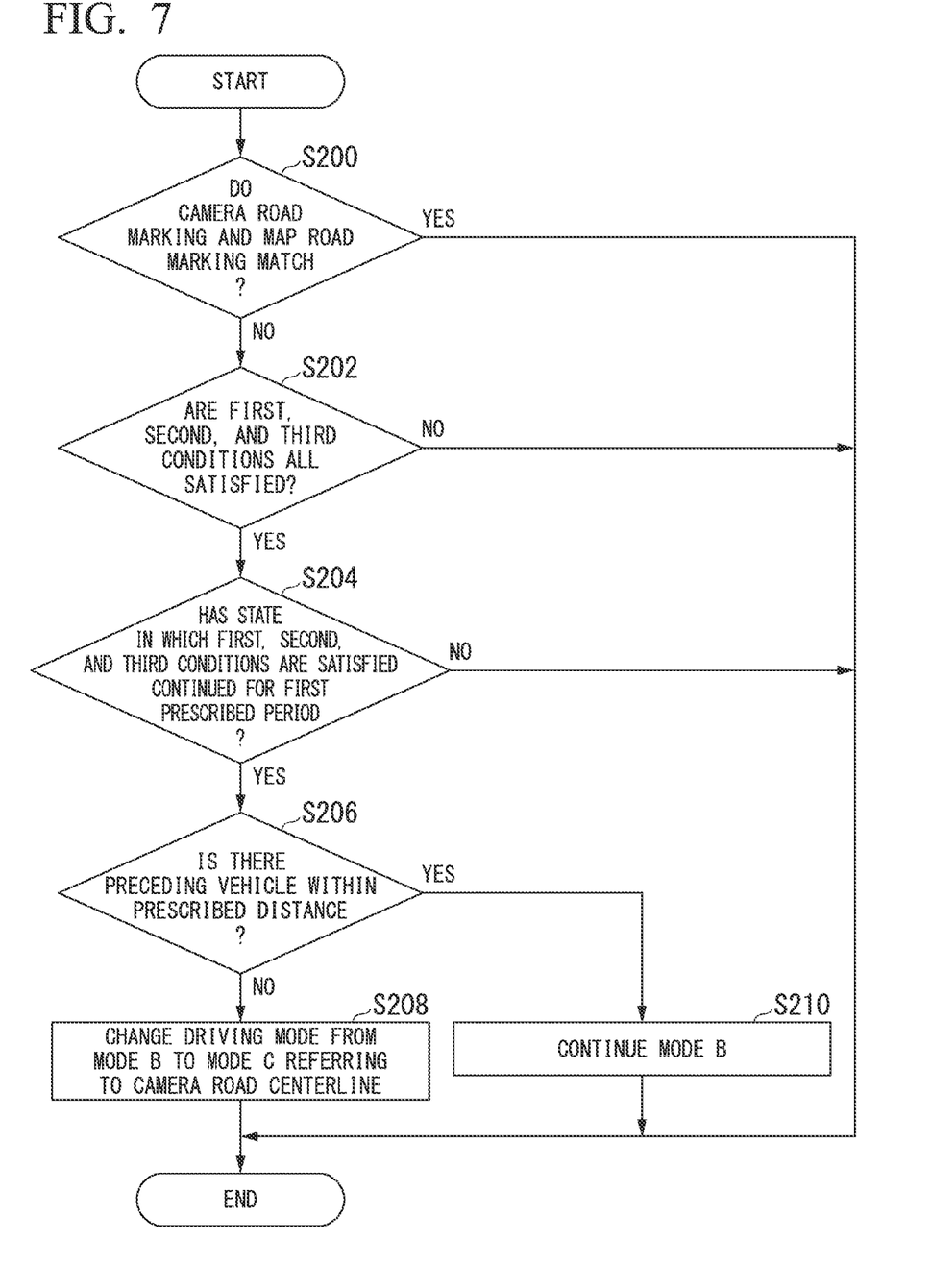
FIG. 7 is a flowchart showing another example of a flow of a process executed by the vehicle control device according to the embodiment.

FIG. 7 is a flowchart showing another example of a flow of a process executed by the vehicle control device according to the embodiment. As in FIG. 6, the process shown in FIG. 7 is iteratively executed while the host vehicle M is traveling in the driving mode of mode B referring to the map road centerline. Because the processing of steps S200 to S204 in FIG. 7 is similar to the processing of steps S100 to S104 in FIG. 6, description thereof is omitted.

In step S204, when it is determined that a state in which the first condition, the second condition, and the third condition are all satisfied has continued for the first prescribed period, the mode decider 150 determines whether or not a preceding vehicle is located within a prescribed distance D with respect to the travel direction of the host vehicle M (step 206). When it is determined that there is a preceding vehicle within a prescribed distance with respect to the travel direction of the host vehicle M, the mode decider 150 causes the driving mode of mode B referring to a travel trajectory of the preceding vehicle to continue (step S210). On the other hand, when it is determined that there is no preceding vehicle within the prescribed distance with respect to the travel direction of the host vehicle M, the mode decider 150 changes the driving mode from the driving mode of mode B referring to the map road centerline to the driving mode of mode C referring to the camera road centerline (step S210). With this, the process of the present flowchart ends.

Figure 8:
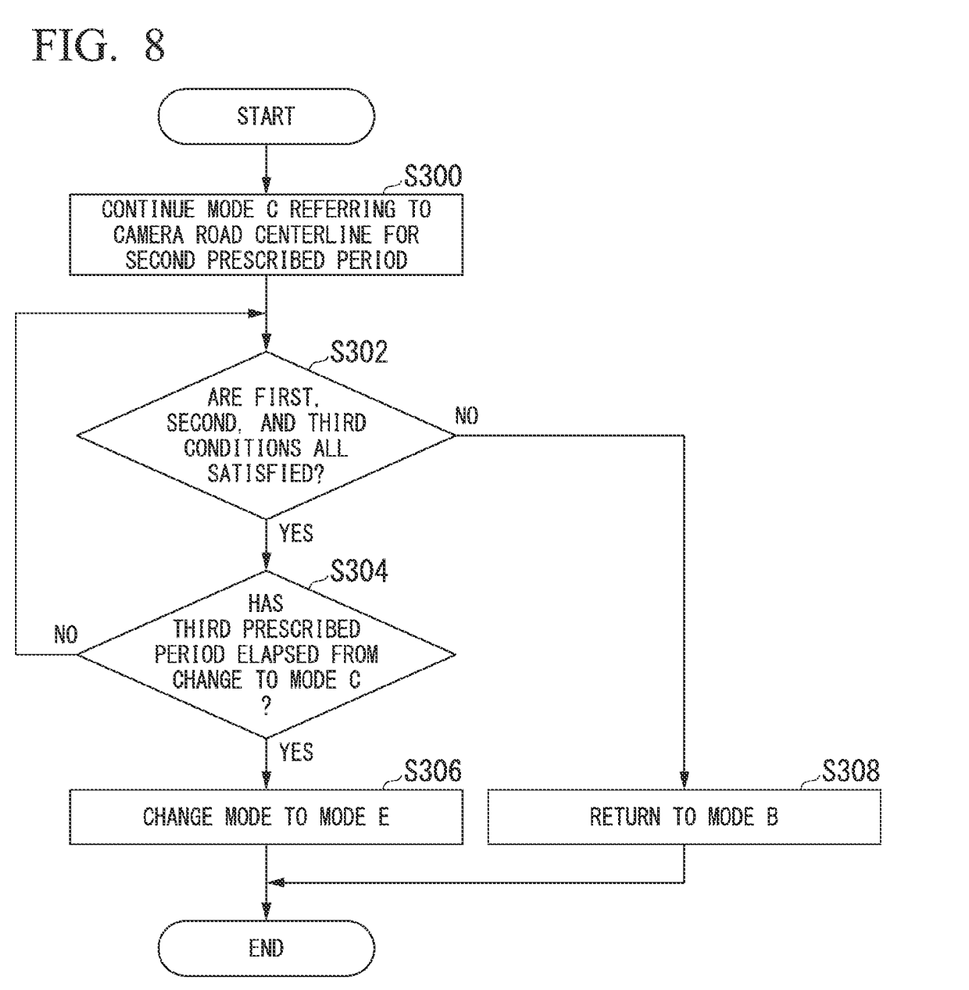
FIG. 8 is a flowchart showing yet another example of a flow of a process executed by the vehicle control device according to the embodiment.

FIG. 8 is a flowchart showing another example of a flow of a process executed by the vehicle control device according to the embodiment. The process of the flowchart shown in FIG. 8 is executed after the processing of step S106 shown in FIG. 6 or the processing of step S208 shown in FIG. 7 is executed.

First, the mode decider 150 continues the driving mode of mode C referring to the camera road centerline for the second prescribed period (step S300). Subsequently, a determiner 156 determines whether or not the first condition, the second condition, and the third condition are all satisfied (step S302). When it is determined that any one of the first condition, the second condition, and the third condition is not satisfied, the mode decider 150 causes the driving mode to return from the driving mode of mode C referring to the camera road centerline to the driving mode of mode B referring to the map road centerline (step S308).

On the other hand, when it is determined that the first condition, the second condition, and the third condition are all satisfied, the determiner 156 determines whether or not the third prescribed period has elapsed after the driving mode was changed to mode C (step S304). When it is determined that the third prescribed period has not elapsed after the driving mode was changed to mode C, the process of the flowchart is returned to step S302. On the other hand, when it is determined that the third prescribed period has elapsed after the driving mode was changed to mode C, the mode decider 150 changes the driving mode to mode E, i.e., manual driving (step S306). With this, the process of the present flowchart ends.

Also, in step S302 of the flowchart shown in FIG. 8, the determiner 156 determines whether or not the first condition, the second condition, and the third condition are all satisfied, but the present invention is not limited to such a configuration. For example, the determiner 156 determines again whether or not the camera road marking CL and the map road marking ML match and the driving mode may be returned to mode B when it is determined that the camera road marking CL and the map road marking ML match.

Furthermore, when the driving mode of mode C has continued for the second prescribed period in step S300 of the flowchart shown in FIG. 8, the determiner 156 determines whether or not the first condition, the second condition, and the third condition are all satisfied in step S302. However, the present invention is not limited to such a configuration. When the driving mode of mode C has continued for the second prescribed period in step S300 of the flowchart of FIG. 8, the determiner 156 may not make the above-described determination and the mode decider 150 may cause the driving mode to return from the driving mode of mode C referring to the camera road centerline to the driving mode of mode B referring to the map road centerline. Thereby, the host vehicle M can be more smoothly returned to the driving mode of mode B.

According to the present embodiment as described above, when it is determined that the camera road marking and the map road marking do not match while the host vehicle M is traveling in the driving mode of mode B referring to map information, it is further determined whether the first condition, the second condition, and the third condition are all satisfied and the driving mode is changed from the driving mode of mode B referring to the map information to the driving mode of mode C referring to the camera information when the first condition, the second condition, and the third condition are all satisfied. Thereby, it is possible to estimate a correct runway even if the content of camera information deviates from that of map information.

The embodiment described above can be represented as follows.

A vehicle control device including:
a storage medium storing computer-readable instructions; and
a processor connected to the storage medium, the processor executing the computer-readable instructions to:
recognize a surrounding situation of a vehicle using at least a camera;
control steering, acceleration, and deceleration of the vehicle independently of an operation of a driver of the vehicle on the basis of the surrounding situation and map information;
decide on a driving mode of the vehicle as one of a plurality of driving modes including a first driving mode and a second driving mode, wherein the second driving mode is a driving mode having a lighter task imposed on the driver than the first driving mode, some of the plurality of driving modes including at least the second driving mode are controlled, and the driving mode of the vehicle is changed to a driving mode having a heavier task when a task related to the decided driving mode is not executed by the driver;
when it is determined that a camera road marking included in the surrounding situation does not match a map road marking included in the map information after it is determined whether or not the camera road marking matches the map road marking while the vehicle is traveling in the second driving mode,
determine whether or not information of a stationary target group detected by a space detection sensor mounted in the vehicle matches information of a free space detected on the basis of an image captured by the camera;
determine whether or not the camera road marking matches the information of the free space;
determine whether or not there is interference between the information of the stationary target group and the map road marking; and change the driving mode from the second driving mode to the first driving mode referring to the camera road marking when it is determined that the information of the stationary target group matches the information of the free space, the camera road marking matches the information of the free space, and there is interference between the information of the stationary target group and the map road marking.

Although modes for carrying out the present invention have been described above using embodiments, the present invention is not limited to the embodiments and various modifications and substitutions can also be made without departing from the scope and spirit of the present invention.

What is claimed is:

1. A vehicle control device comprising:
a storage medium storing computer-readable instructions; and
a processor connected to the storage medium, the processor executing the computer-readable instructions to:
recognize a surrounding situation of a vehicle using at least a camera;
control steering, acceleration, and deceleration of the vehicle independently of an operation of a driver of the vehicle on the basis of the surrounding situation and map information;
decide on a driving mode of the vehicle as one of a plurality of driving modes including a first driving mode and a second driving mode and change the driving mode of the vehicle to a driving mode having a heavier task when a task related to the decided driving mode is not executed by the driver, wherein the second driving mode is a driving mode having a lighter task imposed on the driver than the first driving mode and some of the plurality of driving modes including at least the second driving mode are controlled independently of the operation of the driver of the vehicle;
when it is determined that a camera road marking included in the surrounding situation does not match a map road marking included in the map information after it is determined whether or not the camera road marking matches the map road marking while the vehicle is traveling in the second driving mode,
determine whether or not information of a stationary target group detected by a space detection sensor mounted in the vehicle matches information of a free space detected on the basis of an image captured by the camera;
determine whether or not the camera road marking matches the information of the free space;
determine whether or not there is interference between the information of the stationary target group and the map road marking; and
change the driving mode from the second driving mode to the first driving mode referring to the camera road marking when it is determined that the information of the stationary target group matches the information of the free space, the camera road marking matches the information of the free space, and there is interference between the information of the stationary target group and the map road marking.

2. The vehicle control device according to claim 1,
wherein the stationary target group is a continuous road structure, and
wherein the hardware processor calculates an angle between an extension direction of the road structure and an extension direction of the free space and determines whether or not the information of the stationary target group matches the information of the free space by determining whether or not the angle is less than or equal to a first threshold value.

3. The vehicle control device according to claim 1,
wherein the hardware processor calculates an angle between the camera road marking and an extension direction of the free space and determines whether or not the camera road marking matches the information of the free space by determining whether or not the angle is less than or equal to a second threshold value.

4. The vehicle control device according to claim 1,
wherein the space detection sensor is a radar device, and
wherein the hardware processor determines whether or not there is interference between the information of the stationary target group detected by the radar device and the map road marking.

5. The vehicle control device according to claim 1,
wherein the hardware processor changes the driving mode from the second driving mode to the first driving mode referring to the camera road marking when a period in which it is determined that the information of the stationary target group matches the information of the free space, the camera road marking matches the information of the free space, and there is interference between the information of the stationary target group and the map road marking is greater than or equal to a first period.

6. The vehicle control device according to claim 1,
wherein the hardware processor continues the second driving mode referring to the map road marking when it is determined that the information of the stationary target group does not match the information of the free space, the camera road marking does not match the information of the free space, or there is no interference between the information of the stationary target group and the map road marking.

7. The vehicle control device according to claim 1,
wherein the hardware processor continues the first driving mode referring to the camera road marking for at least a second prescribed period when the second driving mode has been changed to the first driving mode referring to the camera road marking.

8. The vehicle control device according to claim 1,
wherein the hardware processor returns the driving mode from the first driving mode referring to the camera road marking to the second driving mode after the first driving mode referring to the camera road marking is continued for a second prescribed period.

9. The vehicle control device according to claim 1,
wherein the hardware processor returns the driving mode from the first driving mode referring to the camera road marking to the second driving mode when it is determined that the information of the stationary target group does not match the information of the free space, the camera road marking does not match the information of the free space, or there is no interference between the information of the stationary target group and the map road marking after the first driving mode referring to the camera road marking is continued for a second prescribed period.

10. The vehicle control device according to claim 1,
wherein the hardware processor changes the driving mode from the first driving mode referring to the camera road marking to manual driving of the vehicle by the driver of the vehicle when it is determined that the information of the stationary target group matches the information of the free space, the camera road marking matches the information of the free space, and there is interference between the information of the stationary target group and the map road marking after the first driving mode referring to the camera road marking is continued for a third prescribed period.

11. The vehicle control device according to claim 1, wherein the hardware processor continues the second driving mode without changing the driving mode from the second driving mode to the first driving mode referring to the camera road marking if it is determined that there is a preceding vehicle in front of the vehicle when it is determined that the information of the stationary target group matches the information of the free space, the camera road marking matches the information of the free space, and there is interference between the information of the stationary target group and the map road marking.

12. A vehicle control method comprising:
recognizing, by a computer, a surrounding situation of a vehicle using at least a camera;
controlling, by the computer, steering, acceleration, and deceleration of the vehicle independently of an operation of a driver of the vehicle on the basis of the surrounding situation and map information;
deciding, by the computer, on a driving mode of the vehicle as one of a plurality of driving modes including a first driving mode and a second driving mode and changing the driving mode of the vehicle to a driving mode having a heavier task when a task related to the decided driving mode is not executed by the driver, wherein the second driving mode is a driving mode having a lighter task imposed on the driver than the first driving mode and some of the plurality of driving modes including at least the second driving mode are controlled independently of the operation of the driver of the vehicle;
when it is determined that a camera road marking included in the surrounding situation does not match a map road marking included in the map information after it is determined whether or not the camera road marking matches the map road marking while the vehicle is traveling in the second driving mode,
determining, by the computer, whether or not information of a stationary target group detected by a space detection sensor mounted in the vehicle matches information of a free space detected on the basis of an image captured by the camera;
determining, by the computer, whether or not the camera road marking matches the information of the free space;
determining, by the computer, whether or not there is interference between the information of the stationary target group and the map road marking; and
changing, by the computer, the driving mode from the second driving mode to the first driving mode referring to the camera road marking when it is determined that the information of the stationary target group matches the information of the free space, the camera road marking matches the information of the free space, and there is interference between the information of the stationary target group and the map road marking.

13. A computer-readable non-transitory storage medium storing a program for causing a computer to:
recognize a surrounding situation of a vehicle using at least a camera;
control steering, acceleration, and deceleration of the vehicle independently of an operation of a driver of the vehicle on the basis of the surrounding situation and map information;
decide on a driving mode of the vehicle as one of a plurality of driving modes including a first driving mode and a second driving mode and change the driving mode of the vehicle to a driving mode having a heavier task when a task related to the decided driving mode is not executed by the driver, wherein the second driving mode is a driving mode having a lighter task imposed on the driver than the first driving mode and some of the plurality of driving modes including at least the second driving mode are controlled independently of the operation of the driver of the vehicle;
when it is determined that a camera road marking included in the surrounding situation does not match a map road marking included in the map information after it is determined whether or not the camera road marking matches the map road marking while the vehicle is traveling in the second driving mode,
determine whether or not information of a stationary target group detected by a space detection sensor mounted in the vehicle matches information of a free space detected on the basis of an image captured by the camera;
determine whether or not the camera road marking matches the information of the free space;
determine whether or not there is interference between the information of the stationary target group and the map road marking; and
change the driving mode from the second driving mode to the first driving mode referring to the camera road marking when it is determined that the information of the stationary target group matches the information of the free space, the camera road marking matches the information of the free space, and there is interference between the information of the stationary target group and the map road marking.

* * * * *